(12) United States Patent
Schmidt

(10) Patent No.: US 7,228,990 B2
(45) Date of Patent: Jun. 12, 2007

(54) UNITIZED FIBROUS CONSTRUCT DISPENSING SYSTEM

(75) Inventor: Paul Schmidt, Pretty Prairie, KS (US)

(73) Assignee: Polymer Group, Inc., Charlotte, NC (US)

( * ) Notice: Subject to any disclaimer, the term of this patent is extended or adjusted under 35 U.S.C. 154(b) by 224 days.

(21) Appl. No.: 11/013,025

(22) Filed: Dec. 15, 2004

(65) Prior Publication Data

US 2005/0205602 A1    Sep. 22, 2005

Related U.S. Application Data

(60) Provisional application No. 60/529,684, filed on Dec. 15, 2003.

(51) Int. Cl.
*G01G 13/00* (2006.01)

(52) U.S. Cl. .................. 222/77; 222/152; 141/83; 177/116; 406/33; 406/151; 406/169

(58) Field of Classification Search .................. 406/28, 406/33, 151, 152, 153, 169, 173; 222/77, 222/152; 141/83; 177/116
See application file for complete search history.

(56) References Cited

U.S. PATENT DOCUMENTS

| | | | | |
|---|---|---|---|---|
| 4,345,858 A | * | 8/1982 | Barlow | 406/34 |
| 4,614,213 A | * | 9/1986 | Englin | 141/59 |
| 4,756,348 A | * | 7/1988 | Moller | 141/83 |
| 4,862,649 A | * | 9/1989 | Davis et al. | 451/38 |
| 4,975,100 A | * | 12/1990 | Ginelli | 96/397 |
| 5,147,152 A | * | 9/1992 | Link | 406/1 |
| 5,152,433 A | * | 10/1992 | Mohri | 222/152 |
| 5,450,984 A | * | 9/1995 | Rohr | 222/56 |
| 5,529,247 A | | 6/1996 | Mleczewski | |
| 5,803,673 A | * | 9/1998 | Reinsch et al. | 406/31 |
| 5,931,610 A | | 8/1999 | Rixom et al. | |
| 5,947,645 A | | 9/1999 | Rixom et al. | |
| 6,188,936 B1 | * | 2/2001 | Maguire et al. | 700/265 |
| 6,379,086 B1 | * | 4/2002 | Goth | 406/75 |
| 6,527,141 B2 | * | 3/2003 | Sanders | 222/1 |
| 6,776,561 B1 | * | 8/2004 | Yeh | 406/33 |
| 6,805,175 B1 | * | 10/2004 | Pinkas et al. | 141/130 |
| 6,827,529 B1 | * | 12/2004 | Berge et al. | 406/28 |
| 6,877,933 B2 | * | 4/2005 | Ho et al. | 406/180 |
| 7,017,624 B2 | * | 3/2006 | Reinsch et al. | 141/83 |

* cited by examiner

*Primary Examiner*—Joe Dillon, Jr.
(74) *Attorney, Agent, or Firm*—Kilyk & Bowersox, P.L.L.C.; Valerie Calloway

(57) ABSTRACT

The present invention is directed to a method and system for transporting and dispensing fibers into an aggregate mix, and more specifically, to a method and system for transporting and dispensing unitized fibrous constructs into a mix without affecting the structural integrity of the unitized construct. The dispensing system will transport and dispense unitized fibrous constructs intact into a cementitious mixture.

2 Claims, 3 Drawing Sheets

UNITIZED FIBROUS CONSTRUCT DISPENSING SYSTEM

TECHNICAL FIELD

The present invention generally relates to a method and system for transporting and dispensing fibers into an aggregate mix, and more specifically, a method and system for transporting and dispensing unitized fibrous constructs into a mix without affecting the structural integrity of the unitized construct.

BACKGROUND OF THE INVENTION

Many proposals have been made to reinforce, strengthen, or otherwise beneficially alter the properties of cementitious mixtures by applying and/or incorporating various types of fibrous components, including asbestos, glass, steel, as well as synthetic polymer fibers to aqueous based concrete mixes prior to the curing of the concrete. The types of polymer fibers in use or proposed for use include those composed of natural and synthetic compositions.

As is evident in the prior art, individual fibrous components are well known in terms of their performance modifying attributes. Relatively large diameter fibers, for example, can be added to a cementitious mixture such as a wet concrete blend, dispersed in the blend by mechanical agitation, followed by pouring and curing of the concrete. Large diameter staple fibers serve to reinforce the concrete after it has been cured, by providing additional tensile strength and minimizing impact damage and crack propagation. Small diameter staple fibers, typically having a relatively high surface area, are commonly added to concrete mixes in order to reduce the development of small cracks in the concrete during the curing period. The problem of crack development is known to occur as a result of uneven curing of the concrete.

Staple length fibers, as have been conventionally used, are provided in the same form as such are manufactured from the fiber formation line, which included agglomerates of various size and weight, tangles or knots of intermingled staple fibers, and numerous individual staple fibers that are in and of themselves prone to release randomly. More recently, a unitized fibrous construct which comprises a plurality of oriented reinforcing fibrous components has been introduced, such a construct is described in co-pending application Ser. No. 60/442,574, incorporated herein by reference. The fibrous components are cut to a predetermined and finite cut length upon formation and remain in a plural parallel form until such point the unitized fibrous substrate is incorporated and subjected to mechanical agitation during preparation of a cementitious blend or mixture. The unitized fibrous construct is endowed with inherent and improved dispensability and dispersability of the associated reinforcing fibrous component into organic or inorganic cementitious matrixes, such as concrete, mortar, plaster, etc.

While the functional performance of the reinforcing fibrous components is beneficial, the means for the quantitative measurement and physical addition of the reinforcing fibrous components into a cementitious mixture is not without issue. U.S. Pat. No. 5,947,645 and No. 5,931,610, both incorporated herein by reference, disclose a fiber dispensing system for storing and delivering fibrous material which includes a housing for receiving and storing the fibrous material. The fibers are guided out of the housing by fingers that are positioned in a helical or spiral manner along an axle within the housing. The fingers rotate, traveling through the fibers, removing them from the housing and dispensing them in a steady stream into a cementitious mix. An alternate method for dispensing fibers is described in U.S. Pat. No. 5,529,247, also incorporated herein by reference. This method uses an apparatus comprising a U-shaped screen to prevent clumps of fiber from passing through into the cementitious mix.

The aforementioned prior art is not conducive to dispensing unitized fibrous constructs. Although a screen may be altered to pass the unitized bundles, an impact problem still exists. The use of screens, grids, and rotating fingers in dispensing unitized fibrous constructs is problematic due to the constructs colliding with the screen or grid. Such an impact would cause the unitized fibrous constructs to burst prior to being dispensed into an aggregate mix. An unmet need exists for a dispensing system that will transport and dispense unitized fibrous constructs in tact into a cementitious mixture.

SUMMARY OF THE INVENTION

The present invention is directed to a method and system for transporting and dispensing fibers into an aggregate mix, and more specifically, to a method and system for transporting and dispensing unitized fibrous constructs into a mix without affecting the structural integrity of the unitized construct.

In accordance with the present invention, the unitized fibrous constructs are drawn into the system from a source by way of a vacuum. The unitized fibrous constructs may be formed from two or more reinforcing fibrous components of finite staple length and essentially parallel orientation, wherein the composition of such staple fibers is selected from the group consisting of synthetic polymers, natural polymers, and the combinations thereof. Preferably, the composition of the reinforcing fibers is selected from the synthetic polymers including, without limitation, thermoplastic and thermoset polymers. Further, the individual reinforcing fibrous components as incorporated in the unitized fibrous construct need not necessarily be of the same polymeric composition, denier, finite staple length, or functionality.

The unitized fibrous constructs are drawn into the system by air and passed through a separation chamber. Once in the separation chamber, the fibrous constructs drop into a venturi due to gravitational force, while the air exits the system. The fibrous constructs are collected in the venturi, eventually exiting the venturi via a flapper value in a controlled fashion. The venturi is in direct communication with a subsequent weigh bin. The venturi flapper valve will remain open depositing fibrous constructs into the weigh bin until the weigh bin reaches a desired weight, at which point the venturi flapper valve will close. The weigh bin, which also comprises a flapper value, proceeds to unload the desired weight of unitized fibrous constructs into the aggregate mix.

Optionally, the dispensing system may comprise a vibrating mechanism or other means that prevents the fibrous constructs from becoming overly compacted and lodged in the venturi and/or weigh bin. Further, the dispensing system may be assembled within a frame. Further still, when utilizing a frame, the dispensing system may comprise a shock absorbing unit to assist with the stability of the system.

Other features and advantages of the present invention will become readily apparent from the following detailed description, the accompanying drawings, and the appended claims.

DETAILED DESCRIPTION

While the present invention is susceptible of embodiment in various forms, hereinafter is described a presently preferred embodiment of the invention, with the understanding that the present disclosure is to be considered as an exemplification of the invention, and is not intended to limit the invention to the specific embodiment illustrated.

Figure 1:
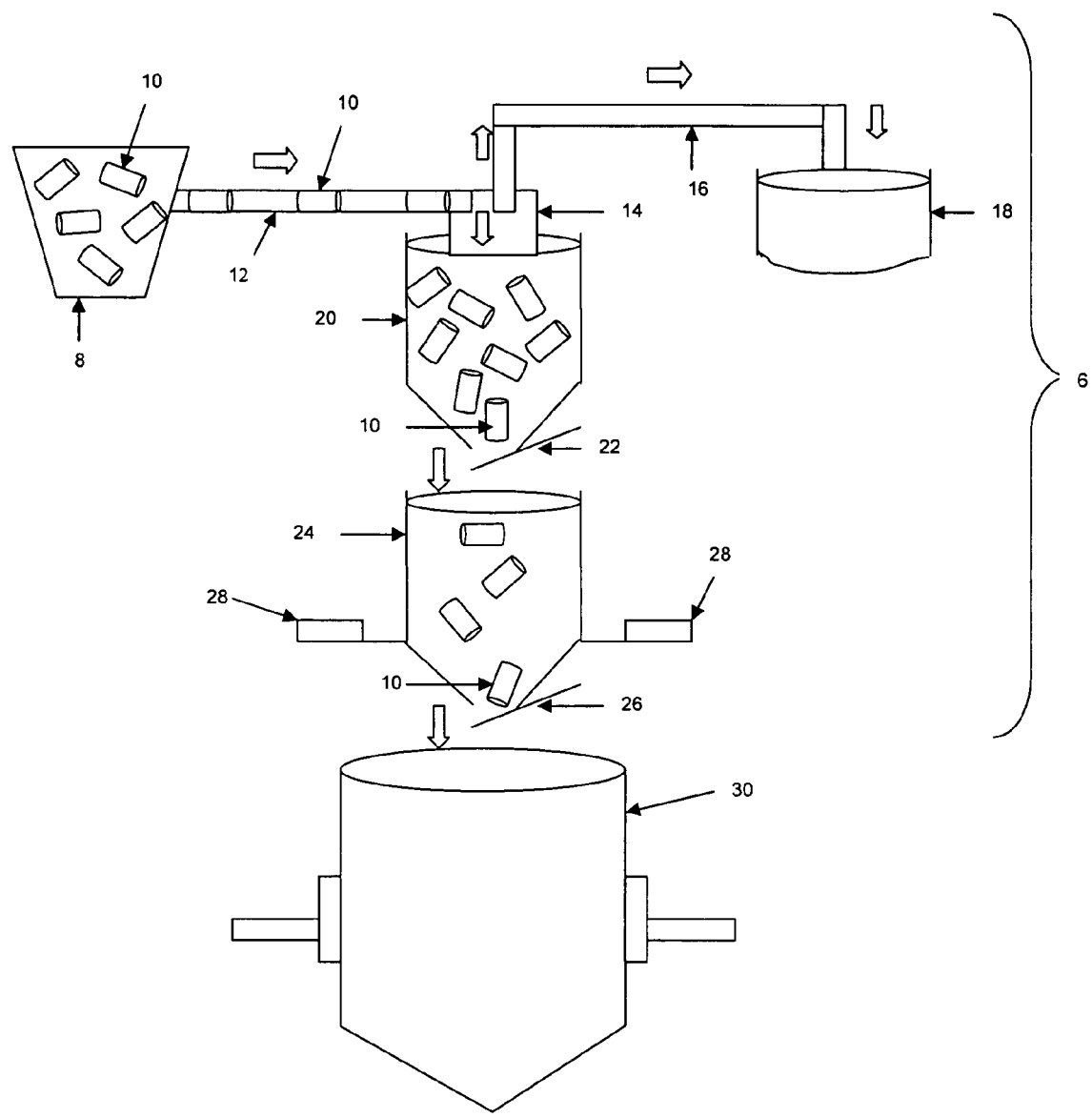
FIG. 1 is a schematic view of a dispensing system in accordance with the present invention.

Referring to FIG. 1, therein is illustrated a schematic view of a dispensing system 6 for transporting and dispensing unitized fibrous constructs 10 into an aggregate mix32 without affecting the structural integrity of the unitized construct.

Figure 2:
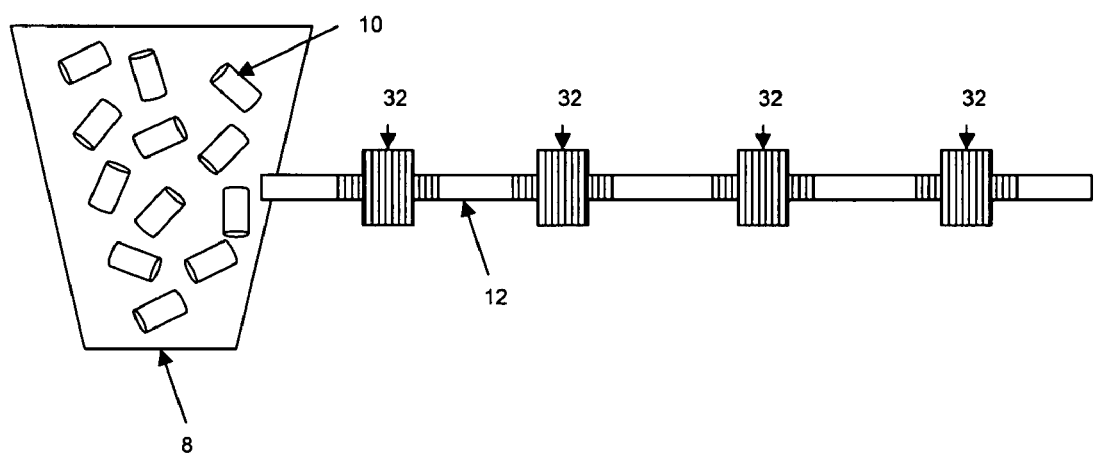
FIG. 2 is a magnified schematic view of a portion of the dispensing system of the present invention.

According to the present invention, unitized fibrous constructs 10 are drawn from a source 8, wherein the source 8 may be a hopper or hanging sac. Further, the fibrous constructs 10 may be extracted from a container via a stinger. Ultimately, the fibrous constructs are drawn into a hose assembly 12, which function to convey the constructs by creating air pressure differentials within the assembly. FIG. 2 is a magnified view of a source 8 of unitized fibrous constructs 10 and the hose assembly 12. The hose assembly 12, comprised of one or more annular rings 32, intakes air and performs by pulling and pushing the fibrous constructs 10 through the hose assembly 12 into a separation chamber 14. The air pressure that is actuated into a first annular ring 32 may be greater, less than, or equal to the pressure actuated into a second annular ring 32. As the fibrous constructs 10 enter the separation chamber 14, the air is channeled out of the chamber 14 through a second hose assembly 16. Additionally, any fibers that may have come loose during transport through the first hose assembly 12 will exit the system through the second hose assembly 16 and collect in a separate bin 18. Once the air is directed out of the chamber 14, gravity takes affect and the fibrous constructs 10 drop into the venturi 20, as is illustrated in FIG. 1.

As the fibrous constructs 10 drop down and funnel through the venturi flapper valve 22, they are deposited into a weigh bin 24. Load cells 28 monitor the weight of the accumulating fibrous constructs 10 in the weigh bin 24. The number of load cells utilized is not meant to be a limiting factor of the present invention. Once a pre-determined desired weight is met in the weigh bin 24, the flapper valve 26 on the weigh bin 24 opens to expel the fibrous constructs 10 into the aggregate mix 30.

The venturi 20 and weigh bin 24 are in constant communication so as to control the number of unitized fibrous constructs 10 that are incorporated into the aggregate mix. The system may be controlled electrically, mechanically, or pneumatically. The flapper valves 22 and 26 have an indirect relationship, wherein when one valve 22 is open, the other valve 26 is closed and vice-versa.

Figure 3:
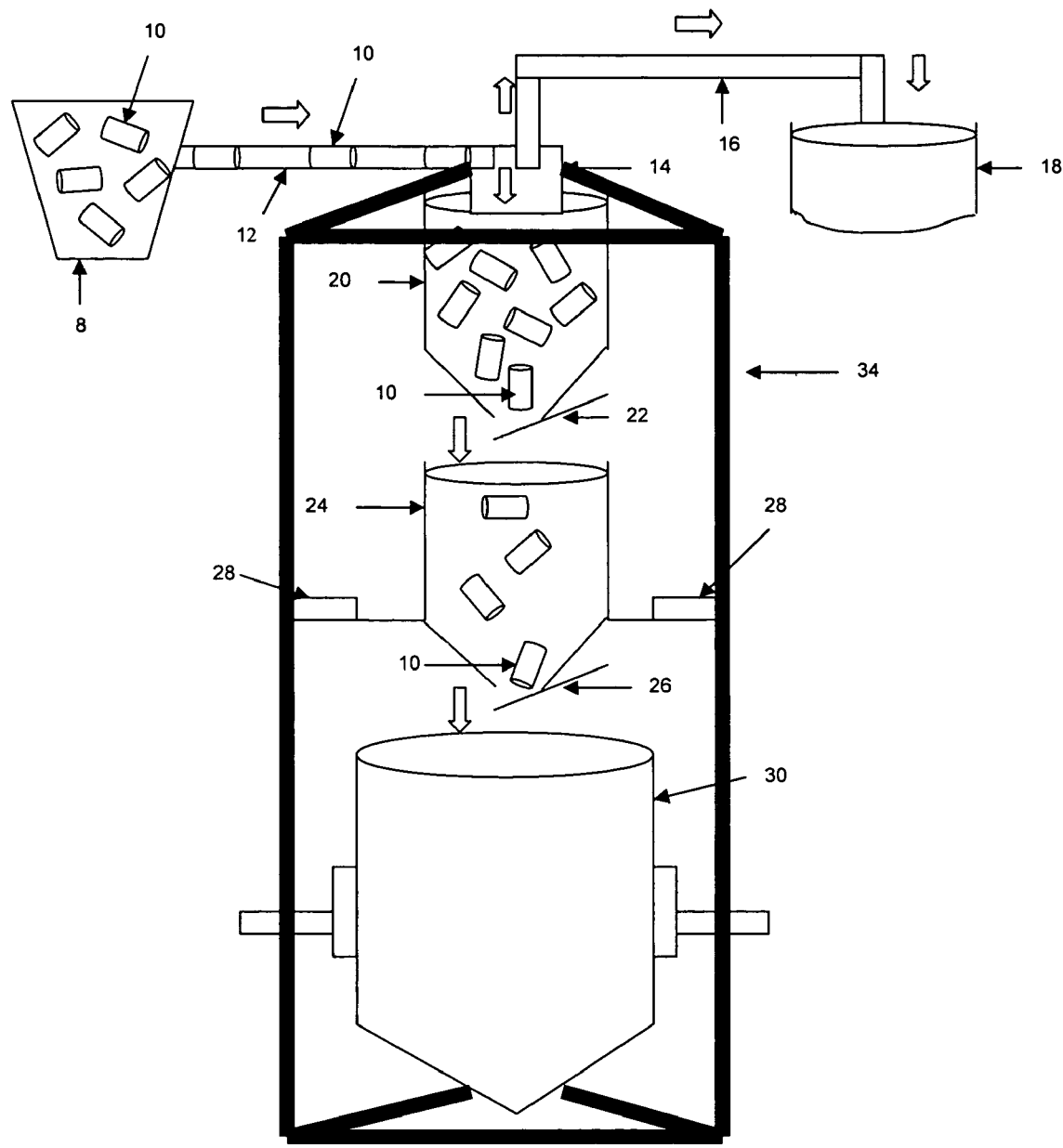
FIG. 3 is a schematic view of a dispensing system in accordance with the present invention.

Optionally, the system of the present invention may comprise a vibration mechanism that can assist with the flow of the unitized fibrous constructs, preventing the fibrous constructs from becoming overly compacted and lodged in the venturi and/or weigh bin. Further, the dispensing system may be assembled within a frame. FIG. 3 shows the dispensing system 6 attached to a frame 34. Further still, when utilizing a frame, the dispensing system may comprise one or more shock absorbing units to assist with the stability of the system.

It is within the purview of the present invention that the various hose assemblies and annular rings be of one or more sizes depending on the length of the unitized constructs to be transported. Unitized fibrous constructs are described in co-pending application Ser. No. 60/442,574, incorporated herein by reference. The dimensions of the unitized fibrous construct is defined in terms of the overall circumference, as based on the quantity and relative denier of the individual reinforcing fibrous components, and of length, as based on the greatest finite staple length of the cumulative combination of reinforcing fibrous components. Suitable overall circumferences and lengths of unitized fibrous constructs formed in accordance with the present invention may reasonably range from 3 mm to 150 mm and from 8 mm to 100 mm, respectively. In a presently preferred embodiment for standard practices, unitized fibrous constructs exhibit an overall diameter of between 3 mm and 30 mm and lengths of between 12 mm and 50 mm may be utilized.

Preferably, the hose assemblies range in diameters from 2.5 to 6 inches for a ¾ inch fiber length. Additionally, the fiber dispensing system may operate using a range of air pressures, preferably between 10 and 50 psi. For optimal performance, the relationship between the amount of air pressure needed for a given hose diameter and the length of the fibers of the unitized construct is such that for a 2.5 inch hose assembly 0.83 psi is need per inch in diameter of the hose for every ¼ inch of fiber length. Further, for a 6 inch hose assembly 4.17 psi is need per inch in diameter of the hose for every ¼ inch of fiber length.

From the foregoing, it will be observed that numerous modifications and variations can be affected without departing from the true spirit and scope of the novel concept of the present invention. It is to be understood that no limitation with respect to the specific embodiments illustrated herein is intended or should be inferred. The disclosure is intended to cover, by the appended claims, all such modifications as fall within the scope of the claims.

What is claimed is:

1. A system for dispensing unitized fibrous constructs, comprising:

a first hose assembly adapted to receive unitized fibrous constructions by drawn air through the hose assembly and defining a passage through which unitized fibrous constructs are conveyable;

a separation chamber adapted to receive air and unitized fibrous constructs from the first hose assembly and for separating the air from the unitized fibrous constructs, and adapted to permit the unitized fibrous constructs to drop downward through the separating chamber;

a second hose assembly adapted to receive air from the separating chamber;

a venturi adapted to receive unitized fibrous constructs from the separation chamber and permit the unitized fibrous constructs to drop downward through the venturi, said venturi comprising a venturi valve at a lower end thereof and adapted to accumulate unitized fibrous constructs and discharge unitized fibrous constructs from the venturi by operable control of the venturi valve;

a weigh bin adapted to receive unitized fibrous constructs from the venturi via the venturi valve and accumulate unitized fibrous constructs, and wherein the weigh bin further comprises a weigh bin valve operable to discharge a pre-determined weight of accumulated unitized fibrous constructs into an aggregate mixer;

a vibrating mechanism operable to assist flow through and prevent over compacting and lodging of said unitized fibrous constructs in said venturi.

2. A system for dispensing unitized fibrous constructs, comprising:

a dispensing assembly comprising:

a first hose assembly adapted to receive unitized fibrous constructions by drawn air through the hose assembly and defining a passage through which unitized fibrous constructs pass ;

a separation chamber adapted to receive air and unitized fibrous constructs from the first hose assembly, and for separating the air from the unitized fibrous constructs and adapted to permit the unitized fibrous constructs to drop downward through the separating chamber;

a second hose assembly adapted to receive air from the separating chamber;

a venturi adapted to receive unitized fibrous constructs from the separation chamber and permit the unitized fibrous constructs to drop downward through the venturi, said venturi comprising a venturi valve at a lower end thereof and adapted to accumulate unitized fibrous constructs and discharge unitized fibrous constructs from the venturi by operable control of the venturi valve;

a weigh bin adapted to receive unitized fibrous constructs from the venturi via the venture valve, and accumulate unitized fibrous constructs, and wherein the weigh bin further comprises a weigh bin valve operable to discharge a pre-determined weight of accumulated unitized fibrous constructs into an aggregate mixer;

a vibrating mechanism operable to assist flow through and prevent over compacting and lodging of said unitized fibrous constructs in said venturi; and a frame to which the dispensing assembly is attached.

* * * * *